United States Patent
Rouquette et al.

(10) Patent No.: US 8,982,662 B2
(45) Date of Patent: Mar. 17, 2015

(54) MULTI-COMPONENT, ACOUSTIC-WAVE SENSOR AND METHODS

(75) Inventors: Robert E. Rouquette, Covington, LA (US); Andre' W. Olivier, River Ridge, LA (US); Dale J. Lambert, Mandeville, LA (US)

(73) Assignee: ION Geophysical Corporation, Houston, TX (US)

( * ) Notice: Subject to any disclaimer, the term of this patent is extended or adjusted under 35 U.S.C. 154(b) by 602 days.

(21) Appl. No.: 13/222,563

(22) Filed: Aug. 31, 2011

(65) Prior Publication Data

US 2012/0057430 A1    Mar. 8, 2012

Related U.S. Application Data

(60) Provisional application No. 61/379,611, filed on Sep. 2, 2010.

(51) Int. Cl.
*G01V 1/38*  (2006.01)
*G01V 1/18*  (2006.01)
*G01V 1/20*  (2006.01)

(52) U.S. Cl.
CPC  *G01V 1/38* (2013.01); *G01V 1/189* (2013.01); *G01V 1/201* (2013.01)
USPC ............................... 367/20; 367/15; 367/153

(58) Field of Classification Search
USPC ..................... 367/15, 20, 153, 154
See application file for complete search history.

(56) References Cited

U.S. PATENT DOCUMENTS

| | | |
|---|---|---|
| 3,286,224 A | 11/1966 | Zefting |
| 3,299,397 A | 1/1967 | Pavey, Jr. et al. |
| 4,345,473 A | 8/1982 | Berni |
| 4,437,175 A | 3/1984 | Berni |
| 4,477,887 A | 10/1984 | Berni |
| 4,486,865 A | 12/1984 | Ruehle |
| 4,520,467 A | 5/1985 | Berni |
| 4,821,241 A | 4/1989 | Berglund |
| 4,935,903 A | 6/1990 | Sanders et al. |
| 4,979,150 A | 12/1990 | Barr |
| 4,982,375 A | 1/1991 | Ng |
| 5,251,181 A | 10/1993 | Toda |
| 5,299,172 A | 3/1994 | Badger et al. |
| 5,621,699 A | 4/1997 | Rigsby et al. |
| 5,621,700 A | 4/1997 | Moldoveanu |
| 5,894,450 A | 4/1999 | Schmidt et al. |
| 6,011,752 A | 1/2000 | Ambs et al. |

(Continued)

FOREIGN PATENT DOCUMENTS

RU        2136019 C1    8/1999
WO    2010059304 A1    5/2010

OTHER PUBLICATIONS

Frank J. Fahey, Measurement of acoustic intensity using the cross-spectral density of two microphone signals,: J. Acoust. Soc. Am., vol. 62, No. 4, Oct. 1977, pp. 1057-1079.

(Continued)

*Primary Examiner* — Ian J Lobo
(74) *Attorney, Agent, or Firm* — James T. Cronvich

(57) ABSTRACT

A multi-component sensor of a fluid-borne acoustic wave that senses pressure and up to three orthogonal particle motion components. The sensor is unresponsive to motion of the sensor mount. Furthermore, the sensor is substantially unresponsive to the turbulent flow of the acoustic medium past the sensor.

40 Claims, 5 Drawing Sheets

(56) References Cited

U.S. PATENT DOCUMENTS

| | | | |
|---|---|---|---|
| 6,128,251 A | 10/2000 | Erath et al. | |
| 6,512,980 B1 | 1/2003 | Barr | |
| 6,525,992 B1 | 2/2003 | Olivier et al. | |
| 6,775,618 B1 | 8/2004 | Robertson et al. | |
| 7,068,568 B2 | 6/2006 | Robertsson | |
| 7,123,543 B2 | 10/2006 | Vaage et al. | |
| 7,167,413 B1 | 1/2007 | Rouquette | |
| 7,239,577 B2 | 7/2007 | Tenghamn et al. | |
| 7,298,672 B1 | 11/2007 | Tenghamn et al. | |
| 7,319,636 B2 | 1/2008 | Robertsson et al. | |
| 7,359,283 B2 | 4/2008 | Vaage et al. | |
| 7,379,386 B2 | 5/2008 | Muyzert et al. | |
| 7,421,346 B2 | 9/2008 | Goujon et al. | |
| 7,460,434 B2 | 12/2008 | Stenzel et al. | |
| 7,466,625 B2 | 12/2008 | Robertson et al. | |
| 7,468,932 B2 | 12/2008 | Tenghamn | |
| 7,548,486 B2 | 6/2009 | Tenghamn | |
| 7,688,674 B2 | 3/2010 | Underhill et al. | |
| 8,553,490 B2 * | 10/2013 | Hillesund et al. | 367/20 |
| 2004/0141355 A1 | 7/2004 | Robertsson et al. | |
| 2005/0194201 A1 | 9/2005 | Tenghamn et al. | |
| 2006/0133202 A1 | 6/2006 | Tenghamn | |
| 2006/0193203 A1 | 8/2006 | Tenghamn et al. | |
| 2006/0203611 A1 | 9/2006 | Robertsson et al. | |
| 2006/0215490 A1 | 9/2006 | Tenghamn et al. | |
| 2006/0239117 A1 | 10/2006 | Singh et al. | |
| 2006/0285434 A1 | 12/2006 | Welker et al. | |
| 2007/0265786 A1 * | 11/2007 | Ozdemir et al. | 702/17 |
| 2007/0297287 A1 | 12/2007 | Robertsson et al. | |
| 2008/0219095 A1 | 9/2008 | Perciot et al. | |
| 2008/0253226 A1 | 10/2008 | Tenghamn et al. | |
| 2008/0291779 A1 | 11/2008 | Muyzert et al. | |
| 2008/0316860 A1 | 12/2008 | Muyzert et al. | |
| 2009/0040872 A1 | 2/2009 | Pabon et al. | |
| 2009/0065289 A1 | 3/2009 | Tenghamn et al. | |
| 2009/0092006 A1 * | 4/2009 | Teigen et al. | 367/19 |
| 2009/0161487 A1 | 6/2009 | Kjellgren et al. | |
| 2009/0296521 A1 | 12/2009 | Perciot et al. | |
| 2009/0296529 A1 | 12/2009 | Boergen et al. | |
| 2009/0323468 A1 | 12/2009 | Teigen | |
| 2010/0039889 A1 | 2/2010 | Teigen et al. | |
| 2010/0039890 A1 | 2/2010 | Tustin et al. | |
| 2010/0039891 A1 | 2/2010 | Cambois | |
| 2010/0124149 A1 | 5/2010 | Barr, Jr. | |
| 2010/0165792 A1 | 7/2010 | Stenzel et al. | |
| 2010/0172208 A1 * | 7/2010 | Belani et al. | 367/21 |
| 2010/0202249 A1 | 8/2010 | Goujon et al. | |
| 2010/0202251 A1 | 8/2010 | Ozdemir et al. | |
| 2011/0176385 A1 | 7/2011 | Lambert | |
| 2011/0182140 A1 | 7/2011 | Lambert et al. | |

OTHER PUBLICATIONS

C. B. Leslie, J. M. Kendall, J. L. Jones, "Hydrophone for Measuring Particle Velocity," J. Acoust. Soc. Am., vol. 28, No. 4, Jul. 1956, pp. 711-715.

International Search Report of PCT/US2011/049937, mailed Aug. 22, 2012, International Searching Authority/European Patent Office, Rijswijk, NL.

Written Opinion of the International Searching Authority of PCT/US2011/049937, mailed Oct. 17, 2012, International Searching Authority/European Patent Office, Rijswijk, NL.

2nd Examination Report, Danish Patent Application No. PA201370182; mailed Jun. 6, 2014.

* cited by examiner

MULTI-COMPONENT, ACOUSTIC-WAVE SENSOR AND METHODS

CROSS-REFERENCE TO RELATED APPLICATIONS

This application claims the priority of U.S. Provisional Patent Application No. 61/379,611, "Multi-Component Sensor of Acoustic Waves in a Fluid and Unresponsive to Motion of its Mount," filed Sep. 2, 2010, and incorporated into this application by reference.

TECHNICAL FIELD

The invention relates generally to sensing the components of a fluid-borne acoustic wave: the pressure and up to three orthogonal particle-motion components. More specifically it relates to a sensor for sensing the acoustic wave without responding to motion of the sensor's mount. Furthermore, it relates to sensing the acoustic wave without responding to the flow of the acoustic medium past the sensor. The invention may be applied to sensing sound in the marine environment. Therefore, the invention may be applied to marine seismic prospecting and more particularly to apparatus and methods for reducing the effects of undesired seismic reflections, which are fluid-borne acoustic waves, in sensors towed behind a survey vessel or in sensors laid on the sea bottom.

BACKGROUND

In towed marine seismic exploration, a hydrophone array is towed behind a marine vessel near the sea surface. The hydrophones reside in multiple sensor cables commonly referred to as streamers. A seismic source, also towed near the sea surface, periodically emits acoustic energy. This acoustic energy travels downward through the sea, reflects off underlying geologic structures, and returns upward through the sea to the hydrophone array. The hydrophone array records the upward-traveling seismic acoustic-pressure waves from the seabed. The hydrophone recordings are later processed into seismic images of the underlying geologic structures.

Acoustic impedance is the ratio of pressure to particle velocity and is equal to the product of the density $\rho$ and the speed of sound c in the acoustic medium, $\rho c$. Reflections occur any time a change in acoustic impedance is encountered by the sound waves. The greater the change in acoustic impedance, the more the energy is reflected. Since the acoustic impedance of air and water differ greatly, the sea surface is a nearly perfect reflector of sound energy. After returning from the sea bottom or the target of interest, the energy is again reflected by the sea surface back toward the hydrophone array. Because a hydrophone has an omnidirectional spatial response, the hydrophone array records a ghost response, which is the seismic acoustic wave reflected from the sea surface and arriving delayed in time and reversed in polarity from the direct reflection. The ghost is a downward traveling seismic acoustic wave that, when added to the desired wave, detracts from the recorded seismic image.

The ghost produces a notch in the frequency spectrum of a hydrophone response at $f_{notch}=c/2d$, where c is the speed of sound and d is the hydrophone array depth. Seismic hydrophone arrays have been conventionally towed at depths of 10 meters or less. At a depth of 10 m, the notch frequency ($f_{notch}$) is 75 Hz. A frequency response extending beyond 100 Hz is required for high seismic-image resolution. Hydrophone arrays are therefore sometimes towed at shallower depths to improve the resolution of a seismic image.

The ghost-causing reflection can also continue to the sea bottom or other strong reflector and be reflected back up to again interfere with the desired reflections and degrade the image. These reflections are commonly referred to as multiples.

Towing at shallow depths is problematic because noise from the sea surface interferes with the desired seismic signals. Furthermore, circular water currents near the sea surface can cause increased flow noise at the streamer skin. These effects are worsened as weather deteriorates, sometimes causing the crew to discontinue operations until the weather improves. The deeper the tow, the less sea-surface noise and weather are factors. If the ghost-notch effects can be eliminated, it is desirable to tow at greater depths.

Ocean-bottom, or seabed, systems, in which the sensors are placed on the seabed, reject ghosts by a technique commonly known as p–z summation. In an acoustic wave, the pressure p is a scalar and the particle velocity u is a vector. A hydrophone records the seismic acoustic wave pressure p, with a positive omnidirectional spatial response. A vertically oriented geophone or accelerometer records the vertical component of the seismic acoustic wave particle velocity $u_z$, with a positive response to up-going signals and a negative response to down-going signals. In p–z summation, the velocity signal is scaled by the acoustic impedance $\rho c$ of seawater and added to the pressure signal. If an accelerometer is used, its output can be integrated to obtain the velocity signal, or the hydrophone pressure signal can be differentiated so that it can better spectrally match the accelerometer. This produces a compound sensor that has full response to the upward traveling wave and zero response to the downward traveling wave to reject the ghost and multiples. One such method of signal conditioning and combination of signals to get a single de-ghosted trace is described in U.S. Pat. No. 6,539,308 to Monk et al. This and similar techniques work well when the acoustic particle-velocity sensor or accelerometer is not affected by unwanted motions due to factors not caused by the desired signal. Such unwanted accelerations are common in a seabed system deployed in a surf zone or area when there are strong bottom currents.

Recently there has been interest in using the combination of hydrophones and particle-motion sensors to reduce the ghost and multiple effects in a seismic streamer. Operating a particle-motion sensor in a seismic streamer presents a problem because the streamer experiences accelerations due to towing and sea-surface effects that are large compared to accelerations caused by the desired seismic reflections. Moreover, these unwanted accelerations are in the same spectral band as the desired seismic reflection response.

Seismic streamers and ocean-bottom seismic cables experience all roll angles from 0° to 360° and moderate pitch angles. To implement a vertically oriented geophone, ocean-bottom systems have used: (a) a gimbaled moving-coil geophone; (b) a 3-component, omni-tilt moving-coil geophone with external attitude sensing and computation external to the sensor to resolve the measurement relative to gravity; and (c) a 3-component, micro-electro-mechanical system (MEMS) accelerometer with internal attitude sensing and computation external to the sensor to resolve the measurement relative to gravity.

U.S. Pat. No. 7,167,413 to Rouquette uses an accelerometer acoustic-wave particle-motion sensor in a seismic streamer to reject the ghost-notch effect. Rouquette uses a mass-spring vibration isolation system to reduce the effect of cable dynamic motion on the accelerometer and a load-cell system to measure and reject the residual cable motion induced noise on the accelerometer. The Rouquette system relies on well-known mechanical relationships that do not remain constant with manufacturing tolerances, aging, and environmental conditions. Rouquette uses a signal processing adaptive algorithm to derive the relationship of the mass-spring system to the acceleration acting on the accelerometer in situ. Dynamic shaking of the accelerometer caused by turbulent flow of the acoustic medium past the sensor is treated the same as the cable dynamic motion and is removed from the acoustic-wave particle-motion measurement. Rouquette describes a complex mechanical and electronic system.

U.S. Pat. No. 7,239,577 to Tenghamn et al. describes an apparatus and method for rejecting the ghost notch using an acoustic-wave particle-velocity sensor. Tenghamn et al. teaches the use of a fluid-damped, gimbaled geophone. It is known in the art that the fluid encapsulating the geophone is chosen to provide damping of the sensor swinging on its gimbals. While not described in Tenghamn et al., it is known in the art that a mass-spring vibration-isolation system can reduce the effect of cable dynamics on the geophone response. But dynamic shaking of the geophone caused by turbulent flow of the acoustic medium past the sensor is not addressed in Tenghamn et al. Motion of the geophone caused by cable dynamics and by turbulent flow of the acoustic medium past the sensor is indistinguishable from acoustic-wave particle motion in the geophone response. The desired seismic-wave particle motion is obscured by cable dynamic motion and turbulent-flow-induced motion in Tenghamn et al.

U.S. Pat. No. 7,359,283 to Vaage et al. describes a method of combining pressure sensors and particle-motion sensors to address the impact of cable dynamic motion and turbulent flow on the particle-motion sensors. In this method, the response of the particle-motion sensor below a certain frequency $f_0$ is not used, but only estimated from the pressure-sensor response and the known pressure-sensor depth. The frequencies rejected are those for which dynamic motion of the streamer is expected and for which turbulent flow of the acoustic medium past the sensor shakes the sensor. The estimated response has poor signal-to-noise ratio at the lower frequencies of interest. This rejection below a certain frequency is not optimal as it also rejects valid signals in an important low-frequency band where deep-target seismic data is likely to exist.

While the patents mentioned all describe methods to reject the ghost notch in a seismic streamer using multi-component acoustic-wave measurements, all fall short of adequately accounting for the effects of sensor-mount motion, sensor tow through the acoustic medium, and acoustic-medium motion on multi-component acoustic sensors. All also fall short of producing high-fidelity, sensed acoustic-wave components with good signal-to-noise ratio down to the lowest frequencies of interest.

SUMMARY

These shortcomings are addressed by an underwater acoustic-wave particle-motion sensor embodying features of the invention. The acoustic-wave particle-motion sensor comprises a rigid body having a periphery around which an underwater acoustic wave diffracts, a diffraction-pressure-gradient acoustic-wave particle-motion sensor coupled to the rigid body, and a rigid-body motion sensor. The diffraction-pressure-gradient acoustic-wave particle-motion sensor senses the diffracted acoustic wave and further produces a first sensor output signal that responds to acoustic-wave particle motion and to rigid-body motion. The rigid-body motion sensor, which is attached to the rigid body, produces a second sensor output signal that corresponds almost entirely to rigid-body motion. In various underwater systems, the rigid body may be coupled to an underwater cable directly, to an external device attached to an underwater cable, or to an autonomous underwater vehicle.

In another aspect of the invention, an underwater diffraction-pressure-gradient sensor embodying features of the invention comprises a rigid body having a periphery surrounding a central longitudinal axis and a first set of recesses circumferentially spaced around and opening onto the periphery and a second set of recesses circumferentially spaced around the periphery. The second set of recesses is longitudinally offset from the first set. A pressure sensor resides in each one of the recesses. The rigid body diffracts underwater acoustic waves around the periphery of the rigid body.

In yet another aspect of the invention, a method for determining the response to acoustic waves in a fluid medium embodying features of the invention comprises: (a) acquiring acoustic-pressure signals from a plurality of pressure sensors mounted at the periphery of a rigid body disposed in a fluid medium and diffracting acoustic waves around the periphery; (b) producing pressure-gradient signals from the acoustic-pressure signals that include responses to acoustic waves, responses due to motion of the rigid body, and responses due to the flow of the fluid medium past the pressure sensors in the rigid body; (c) acquiring rigid-body motion signals with a motion sensor coupled to the rigid body; (d) producing motion sensor signals that include responses due to motion of the rigid body and responses due to the flow of the fluid medium past the motion sensor; and (e) combining the pressure-gradient and motion sensor signals to produce an output signal that includes the response to acoustic waves and is substantially independent of signals corresponding to the motion of the rigid body or to the flow of the fluid medium past the pressure and motion sensors. Data corresponding to some of the signals acquired by the sensors or produced according to the method may be stored on a computer-readable storage medium for subsequent processing.

In still another aspect of the invention, an underwater sensor embodying features of the invention comprises a pressure-gradient acoustic-wave particle-motion sensor that includes acoustic-wave pressure sensors disposed at fixed relative positions. The acoustic-wave pressure sensors each have individual frequency responses that are combined to produce a pressure-gradient frequency response. The individual frequency responses of the acoustic-wave pressure sensors are matched closely enough over an operating-frequency range to attenuate the pressure-gradient frequency response to acoustic-wave pressure below the pressure-gradient frequency response to acoustic-wave particle motion.

In another aspect of the invention, an underwater sensor embodying features of the invention comprises a rigid mounting body having an outer periphery and recesses at regularly spaced positions opening onto the periphery and a plurality of pressure sensors received in the recesses at the regularly spaced positions to form a pressure-gradient sensor. The frequency responses of the pressure sensors are matched in magnitude and phase over an operating-frequency range.

In another aspect of the invention, a method for making an underwater pressure-gradient acoustic-wave sensor having the performance capabilities of a particle-motion sensor embodying features of the invention comprises: (a) acquiring first and second pressure signals from first and second acoustic-wave pressure sensors attached to a rigid body at spaced apart locations; (b) producing a pressure-gradient signal from the difference of the first and second pressure signals; and (c) matching the frequency responses of the first and second pressure signals over an operating-frequency range to attenuate in the pressure-gradient signal the response to acoustic-wave pressure below the response to acoustic-wave particle motion.

BRIEF DESCRIPTION OF THE DRAWINGS

These aspects and features of the invention are better understood by referring to the following description, appended claims, and accompanying drawings, in which:

DETAILED DESCRIPTION

Figure 1:
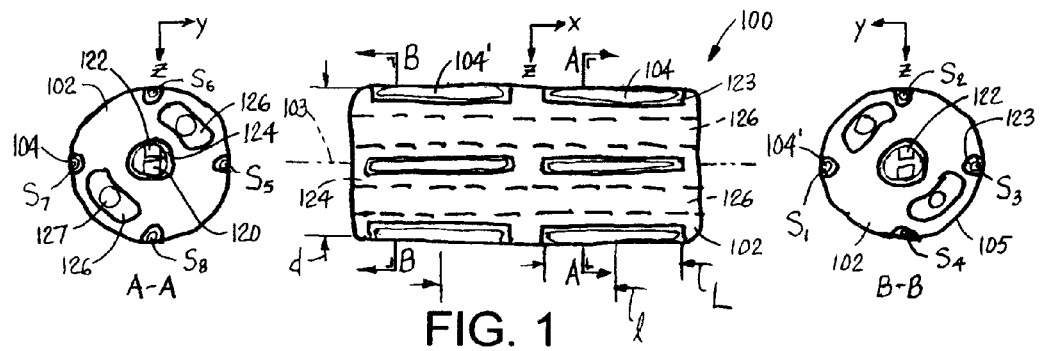
FIG. 1 includes a side view and two cross-section views of one version of a multi-component sensor of fluid-borne acoustic waves embodying features of the invention.

In FIG. 1, an acoustic wave sensor 100 embodying features of the invention is cylindrical in shape to adapt it for use in a fluid acoustic medium that flows past the sensor in the direction of the sensor's long axis, the x-axis. A fluid is a gas or a liquid. Aerodynamic or hydrodynamic shapes may be applied fore and aft of the sensor body to streamline the flow of the acoustic medium past the sensor and to cause the sensor body to approximate the infinitely long cylinder model for acoustic-wave diffraction.

In a water or liquid acoustic application, the flow may be water current, liquid flow, towing of the sensor through the water, or any other arrangement that causes the liquid acoustic medium to flow past the sensor. In a liquid acoustic application, pressure sensors 104 are hydrophones, preferably piezoelectric hydrophones.

In an air or gas acoustic application, the flow may be wind, gas flow, towing of the sensor through the air, or any other arrangement that causes the gas acoustic medium to flow past the sensor. In an air acoustic application, the pressure sensors 104 are microphones, preferably condenser microphones.

Although the operating principles of this sensor apply to any fluid acoustic medium, the remainder of this disclosure describes the sensor in the liquid acoustic medium, specifically water, as an example.

Pressure sensors 104, 104' positionally defined as pressure sensors $S_1$-$S_8$ produce acoustic pressure signals $p_1$-$p_8$. Each pressure sensor may be realized as a single element or a group of elements mounted in a rigid body 102 such that the acoustic wave can diffract around the sensor mounting body without passing through. The rigid body may be any shape convenient to the application, but is depicted as cylindrical in the following examples with a longitudinal axis 103 and an outer periphery 105. The pressure sensors in this embodiment have a length much greater than their thickness and width or their diameter and are each mounted in recesses 123 regularly spaced around and opening onto the periphery of the rigid body. Throughout this specification, "rigid," in reference to a mounting body means that the outer surface of the pressure-sensor mounting body and the positions of the pressure sensors within the body have no significant displacement, strain, or change of shape due to any and all stresses caused by acoustic waves or mechanical forces applied to the sensor mounting body. The relative positions of the sensors mounted in the mounting body are fixed by the body's rigidity.

Co-located with the pressure sensors within the rigid sensor mounting body is a second type of sensor 120—a motion sensor that measures the motion of the rigid sensor body, which is opaque to the acoustic wave. The motion sensor may be any sensor responsive to motion; i.e., displacement, velocity, or acceleration. Accelerometers, geophones, seismometers, acceleration-sensitive microphones, acceleration-sensitive hydrophones, groups of similar such sensors, or combinations of different such sensors are examples of other motion-sensor realizations. The motion sensor 120 produces a sensor signal $a_{bm}$ that responds to the motion of the rigid sensor-mounting body to which it is mechanically coupled. In the preferred embodiment, $a_{bm}$ is an acceleration vector, the three orthogonal components of which are $a_{bmx}$, $a_{bmy}$, and $a_{bmz}$. The motion sensor 120 may be mounted in a cavity or cavities, such as a central cavity 124, within the sensor mounting body and isolated from particle motion. Thus, the motion sensor functions a rigid-body motion sensor and not a particle-motion sensor. The cavity may have any shape that preserves the rigidity of the sensor mounting body.

Because of the possibility of dynamic rotation of the sensor body, an orientation sensor 122 associated with the motion sensor 120 is used to orient the sensor measurements relative to the gravity vector if required by the sensor application. A multi-axis sensor such as a MEMS accelerometer having a response down to dc combines the sensor-body-motion sensing and the orientation sensing in a single device. Conventional coordinate-transformation computation means can be used to orient the sensor measurements relative to gravity. The motion sensor 120 may be a two-axis unit if one axis of orientation is known and sensor-body motion along that axis is not needed. A two-axis orientation sensor 122 is usable in a towed sensor for which the longitudinal axis parallel to the sensor tow is determined by other means, such as a navigation system. Another alternative is a separate orientation sensor used in combination with the motion sensor. The orientation sensor 122 may be mounted in the cavity 124, within the sensor body, of any shape that preserves the rigidity of the sensor mounting body. In any event, the sensor signal from the sensor 120 used throughout this specification refers to a sensor-body-referenced, as opposed to a gravity-referenced, measurement.

Signal-conditioning electronics for the pressure sensors and the motion sensors may be housed in the cavity or cavities 124, within the sensor body, of any shape that preserves the rigidity of the sensor mounting body. Passageways 126 through the sensor body facilitate application of the sensor. The passageways may be of any shape that preserves the rigidity of the sensor mounting body. The passageways 126 may carry tow cables 127, wiring, or other devices that are useful for the deployment of the sensor.

The sensor response to acoustic-wave pressure is given by $$p = \frac{p_1 + p_2 + p_3 + p_4 + p_5 + p_6 + p_7 + p_8}{8} \quad \text{(Eq. 1)}$$

This is the well-known equation for a compound pressure sensor and is the average of the individual pressure-sensor outputs. This compound acoustic-wave pressure sensor made up of the eight individual pressure sensors behaves as a point sensor for acoustic pressure up to $\lambda_{min}$, where the largest sensor dimension is less than $\lambda_{min}/20$, and $\lambda_{min}$ is the shortest wavelength of sound to be sensed. The response p is the acoustic-wave pressure plus a noise component due to any turbulent-flow eddies at the surface of the sensor.

A pressure sensor having a length L longer than the characteristic length of the turbulent-flow eddies attenuates the flow pseudo-pressure noise relative to the flow-noise response of a point sensor. As shown in "Narrow-Band Investigations of the Longitudinal Space-Time Correlation Function in Turbulent Airflow," JASA, 1964, Henry P. Bakewell, Jr. (Bakewell), which is incorporated by reference, the characteristic length is given by $\xi = U_c/0.7f$, where $U_c$ is the convective flow rate and f is frequency. The average convective flow rate is 0.8 times the flow velocity. Flow noise is attenuated by 10 log L/$\xi$=10 log 0.7fL/$U_c$=10 log f/$f_{cl}$ for frequencies above $f_{cl}$=$U_c$/0.7L, and is not attenuated below this frequency. This is so because the flow-noise pseudo-pressure random process is statistically independent at a separation of the characteristic length or greater. For example, for a water acoustic sensor having a configuration as shown in FIG. 1, with a flow velocity of 2.5 m/s, and an aggregate pressure-sensor length L of 100 mm, i.e., the combined length of longitudinally aligned pressure-sensor pairs 104 and 104' (e.g., $S_8$ and $S_4$), the frequency $f_{cl}$ is 29 Hz.

The flow-noise pseudo-pressure random process is statistically independent at a separation of the characteristic length or greater in the circumferential direction as well. Flow noise is attenuated by 10 log N=10 log 4=6 dB for frequencies above $f_{cc}$=$U_c$/0.7L, and is not attenuated below this frequency. This is so because the flow-noise pseudo-pressure random process is statistically independent at a separation of the characteristic length or greater, and the sensors are point receivers of the turbulent-flow eddies in the circumferential direction. Continuing the example of a water acoustic sensor having a configuration as shown in FIG. 1, with a flow velocity of 2.5 m/s, and diameter d of 50 mm, the separation $L_c$ of pressure sensors 90° apart on the circumference is 39.3 mm, and the frequency $f_{cc}$ is 73 Hz.

A fluid-media acoustic-pressure sensor having a configuration as shown in FIG. 1 has low response to flow noise while behaving as a point sensor for acoustic pressure up to $\lambda_{min}$, where the largest sensor dimension is less than $\lambda_{min}/20$, and $\lambda_{min}$ is the shortest wavelength of sound to be sensed. In a preferred embodiment, the longest largest sensor dimension is 100 mm, resulting in an upper operating frequency of 750 Hz as a point sensor for acoustic pressure in water.

As shown in "Measurement of Acoustic Intensity Using the Cross-Spectral Density of Two Microphone Signals," JASA, 1977, Frank J. Fahy, which is incorporated by reference, acoustic-wave particle motion may be sensed by a pressure-gradient sensor, which is described by the zero-mean-flow fluid momentum equation that relates the pressure gradient to the particle acceleration:

$$\frac{dp}{dx} = -\rho \frac{du_x}{dt} = -\rho a_x \quad \text{(Eq. 2)}$$

where $u_x$ is the component of acoustic-wave particle velocity in the x direction and $a_x$ is the component of acoustic-wave particle acceleration in the x direction. This equation is valid for acoustic waves in free space where there is no diffraction around a solid body. This condition is met when an acoustic wave propagates in the x direction past an infinitely long cylinder. As stated above, this condition is met in practice when aerodynamic or hydrodynamic shapes are applied fore and aft of the sensor body to streamline the flow of the acoustic medium past the sensor and to cause the sensor body to approximate the infinitely long cylinder model for acoustic wave diffraction.

A pressure-gradient sensor may be realized by taking the difference of the responses of two individual pressure sensors spaced in the x direction by a distance l provided the largest sensor dimension is less than $\lambda_{min}/20$, and $\lambda_{min}$ is the shortest wavelength of sound to be sensed, where l is the distance between the acoustic centers of sensors of finite extent.

For a pressure-gradient sensor to perform well as an acoustic-wave particle-motion sensor, the response of each of the two constituent pressure sensors must be well matched. The two constituent pressure sensors each respond to the acoustic-wave pressure. When the difference of the responses of two pressure sensors is taken, the differential acoustic-wave pressure response must be attenuated far below the differential acoustic-wave particle-motion response. This is accomplished by matching the frequency response of each of the two constituent pressure sensors in magnitude and phase over the intended operating-frequency range of the sensor. In the preferred embodiment, the frequency responses of the two constituent pressure sensors are closely matched to ±0.1% or better in both magnitude and phase. ±0.1% phase matching means matching to ±0.001 radian, which is ±0.0573°.

Figure 12:
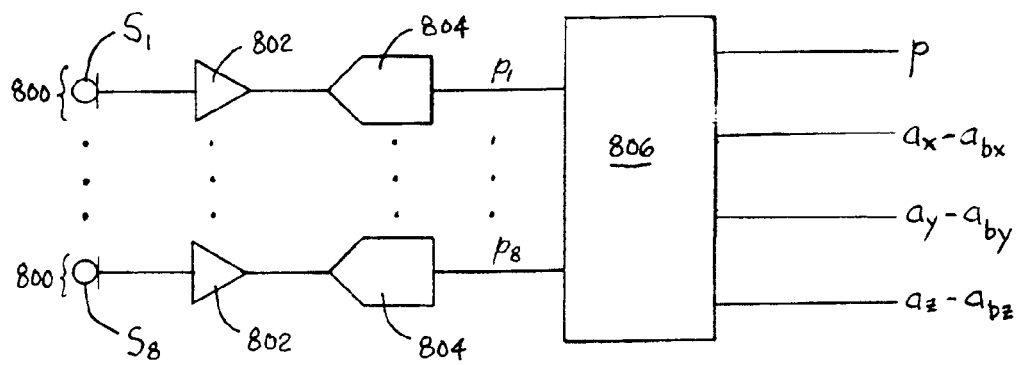
FIG. 12 is a block diagram of one version of a data-acquisition and signal-processing system for the pressure sensors in the multi-component sensor of FIG. 1.

The phase matching is accomplished by: (a) fabricating the pressure sensors from the same batch of piezoelectric material; (b) controlling the dimensions of the pressure sensors and their mounts to ±0.1% tolerance or better; and (c) conditioning the pressure sensors' outputs with charge amplifiers or their equivalent. The magnitude matching is accomplished by employing means to adjust the scale factor of each pressure-sensor data-acquisition channel. As shown in FIG. 12 for the eight-sensor pressure-gradient sensor of FIG. 1, each of the eight data-acquisition channels 800 includes a pressure sensor S1-S8 and associated circuitry including a conditioning amplifier 802, such as a charge amplifier or an instrumentation amplifier, and its corresponding data-acquisition device, such as an analog-to-digital (A-D) converter 804 producing one of the outputs $p_1$-$p_8$. Standard static (at time of manufacture) scale-factor, or gain, adjustment techniques and procedures can be applied to each data-acquisition channel. Also, standard methods and means that maintain data-acquisition-channel frequency-response amplitude and phase matching to account for the effects of aging and environment (for example, temperature, shock, and vibration) can be used.

It is advantageous to measure the matching of the frequency-response amplitude and phase of the data-acquisition channels in situ to account for the effects of aging and environment and to relax the matching requirements at sensor manufacture. A preferred embodiment includes a signal-processing operation that follows the data-acquisition operation in a digital signal processor (DSP) 806. The DSP may be local to each pressure-gradient sensor or remotely located. For each acoustic-pressure data-acquisition channel, the signal processor performs a frequency-domain cross-correlation between the compound pressure signal p computed by the DSP 806 according to Eq. 1 and one of the individual pressure-sensor signals $p_1$-$p_8$. The frame length of the cross-correlation is chosen long enough to limit the statistical error of the cross-correlation to less than ±0.01%. Signal-processing frequency-domain cross-correlation algorithms are well-known in the art.

The magnitude and phase of the computed cross-correlation coefficient spectra are respectively the multiplicative magnitude correction and the additive phase correction for each acoustic-pressure data-acquisition channel. Applying the respective amplitude and phase correction to each acoustic-pressure data-acquisition channel matches the channels $p_1$-$p_8$ to better than ±0.1% among each other and to the pressure response p.

The sensor response to the x-axis component of the acoustic-wave particle acceleration is computed in the DSP 806 and is given by $$a_x - a_{bx} = \frac{+p_1 + p_2 + p_3 + p_4 - p_5 - p_6 - p_7 - p_8}{4\rho l}$$

This is the well-known equation for a compound pressure-gradient sensor, where $\rho$ is the density of the acoustic medium and l is the spacing between the pressure sensors' acoustic centers and represents the realization of a pressure-gradient sensor from individual pressure-sensor outputs $p_1$-$p_8$. The pressure-gradient response is the x-axis component of the acoustic-wave particle acceleration $a_x$ minus the x-axis component of the sensor-mount rigid-body acceleration $a_{bx}$. This is so because the datum for defining acceleration and pressure gradient in Eq. 2 is the midpoint of the acoustic centers of the pressure sensors.

To obtain the x-axis component of the acoustic-wave particle acceleration, the x-axis component of rigid-body motion sensor 120 is added to the x-axis component of the pressure-gradient sensor:

$$a_x = a_x - a_{bx} + a_{bmx} \quad \text{(Eq. 3)}$$
$$= \frac{+p_1 + p_2 + p_3 + p_4 - p_5 - p_6 - p_7 - p_8}{4\rho l} + a_{bmx}$$

The sensor response to the x-axis component of the acoustic-wave particle acceleration is exact to the extent that $a_{bmx} = a_{bx}$; i.e., the relative accuracy of the pressure-gradient sensor and the rigid-body motion sensor 120. The relative accuracy of the pressure-gradient sensor and the rigid-body motion sensor is ±0.1% or better in the preferred embodiment. The additional computation given by Eq. 3 combining the x-axis components of the outputs of the pressure-gradient sensor and the rigid-body motion sensor may be performed in the DSP 806.

The response of the x-axis pressure-gradient sensor to flow noise is attenuated by the configuration of FIG. 1 relative to the flow-noise response of a point sensor. As explained previously, flow noise is attenuated by 10 log $f/f_{cl}$ for frequencies above $f_{cl} = U_c/0.7L$. For example, for a water acoustic sensor having a configuration as shown in FIG. 1, with a flow velocity of 2.5 m/s, and an aggregate pressure-sensor length 2L of 100 mm, i.e., the combined length of longitudinally aligned pressure-sensor pairs 104 and 104', the frequency $f_{cl}$ is 29 Hz. The negative signs of some terms in Eq. 3 do not change this result because the flow-noise pseudo-pressure random process is statistically independent at a separation of the characteristic length or greater.

Below frequency $f_{cl}$ there is attenuation due the differencing of pressure sensors separated by distance l. As shown in Bakewell, the flow-noise pseudo-pressure random process has a correlation coefficient $e^{-0.7|f\xi/U_c|} = e^{-f/f_{c\xi}}$ between two points separated by Flow noise is attenuated by $-20 \log f/f_{c\xi}$ for frequencies below $f_{c\xi} = U_c/0.7$. Continuing the example of a water acoustic sensor having a configuration as shown in FIG. 1, with a flow velocity of 2.5 m/s, and a pressure-sensor separation l of 50 mm, the frequency $f_{c\xi}$ is 57 Hz.

As explained previously, flow noise is attenuated by 10 log N=10 log 4=6 dB for frequencies above $f_{cc} = U_c/0.7 L_c$ and is not attenuated below this frequency. This is so because the flow-noise pseudo-pressure random process is statistically independent at a separation of the characteristic length or greater, and the sensors are point receivers of the turbulent-flow eddies in the circumferential direction. Continuing the example of a water acoustic sensor having a configuration as shown in FIG. 1, with a flow velocity of 2.5 m/s, and diameter d of 50 mm, a separation $L_c$ of pressure sensors 90° apart on the circumference is 39.3 mm, the frequency $f_{cc}$ is 73 Hz.

The operations of the y-axis and the z-axis acoustic-wave particle-motion sensors follow a related but different physical principle. As shown in "Vibration and Sound," Acoustical Society of America, 1976, Philip M. Morse (Morse), incorporated by reference, an acoustic wave diffracting around a rigid cylinder produces a pressure on the near side that is different from the pressure on the far side, and which is described by the equation that relates the pressure difference to the particle acceleration:

$$p_{fore} - p_{aft} = 2d\rho a_y$$

where $a_y$ is the component of acoustic-wave particle acceleration in the y direction. This condition is met when an acoustic wave propagates in the y direction broadside to an infinitely long cylinder. As stated previously, this condition is met in practice when aerodynamic or hydrodynamic shapes are applied fore and aft of the sensor body to streamline the flow of the acoustic medium past the sensor and to cause the sensor body to approximate the infinitely-long-cylinder model for acoustic-wave diffraction.

A diffraction-pressure-gradient sensor may be realized by taking the difference of the responses of two pressure sensors 104 mounted on a rigid cylinder and spaced in the y direction by the diameter d provided the largest sensor dimension is less than $\lambda_{min}/20$, and $\lambda_{min}$ is the shortest wavelength of sound to be sensed. In practice, the pressure sensors 104 reside in recesses 123 in the rigid body, but they respond to the pressure at the recess openings on the cylinder's outer diameter.

The diffraction-pressure-gradient sensor's response to the y-axis component of the acoustic-wave particle acceleration is computed in the DSP 806 and is given by $$a_y - a_{by} = \frac{+p_3 + p_7 - p_1 - p_5}{4\rho d} \quad \text{(Eq. 4)}$$

This is the equation for a compound diffraction-pressure-gradient sensor, where $\rho$ is the density of the acoustic medium and d is the diameter of the rigid cylinder upon which the pressure sensors are mounted. The response is the y-axis component of the acoustic-wave particle acceleration $a_y$ minus the y-axis component of the sensor-mount rigid-body acceleration $a_{by}$. This is so because the datum for defining acceleration and pressure differences in Eq. 4 is the midpoint of the acoustic centers of the pressure sensors.

To obtain the y-axis component of the acoustic-wave particle acceleration, the y-axis component of rigid-body motion sensor 120 is added to the y-axis component of the diffraction-pressure-gradient sensor:

$$a_y = a_y - a_{by} + a_{bmy} = \frac{+p_3 + p_7 - p_1 - p_5}{4\rho d} + a_{bmy} \quad \text{(Eq. 5)}$$

The sensor response to the y-axis component of the acoustic-wave particle acceleration is exact to the extent that $a_{bmy} = a_{by}$; i.e., the relative accuracy of the diffraction-pressure-gradient sensor and the rigid-body motion sensor 120. The relative accuracy of the diffraction-pressure-gradient sensor and the rigid-body motion sensor is ±0.1% or better in the preferred embodiment. The addition given by Eq. 5 for combining the outputs of the y-axis components of the diffraction-pressure-gradient sensor and the rigid-body motion sensor may be performed in the DSP 806.

The response of the y-axis diffraction-pressure-gradient sensor to flow noise is attenuated by the configuration of FIG. 1 relative to the flow-noise response of a point sensor. As explained previously, flow noise is attenuated by 10 log f/$f_{cl}$ for frequencies above $f_{cl}=U_c/0.7L$. For example, for a water acoustic sensor having a configuration as shown in FIG. 1, with a flow velocity of 2.5 m/s, and an aggregate pressure-sensor length 2L of 100 mm, i.e., the combined length of longitudinally aligned pressure-sensor pairs 104 and 104', the frequency $f_{cl}$ is 29 Hz. The negative signs of some terms in Eq. 5 do not change this result because the flow-noise pseudo-pressure random process is statistically independent at a separation of the characteristic length or greater.

Below frequency $f_{cl}$ there is attenuation due the differencing of pressure sensors separated by distance d. As shown by Bakewell, the flow-noise pseudo-pressure random process has a correlation coefficient $e^{-0.7|f\xi/U_c|}=e^{-f/f_{c\xi}}$ between two points separated by $\xi$. Flow noise is attenuated by −20 log f/$f_{c\xi}$ for frequencies below $f_{c\xi}=U_c/0.7\xi$. Continuing the example of a water acoustic sensor having a configuration as shown in FIG. 1, with a flow velocity of 2.5 m/s, and a pressure-sensor circumferential separation $l_c$ of 78.5 mm, the frequency $f_{c\xi}$ is 36 Hz.

Similarly, the diffraction-pressure-gradient sensor response to the z-axis component of the acoustic-wave particle acceleration is computed by the DSP and is given by $$a_z - a_{bz} = \frac{+p_4 + p_8 - p_2 - p_6}{4\rho d}$$

To obtain the z-axis component of the acoustic-wave particle acceleration, the DSP 806 combines the acoustic-wave particle acceleration with the rigid-body motion along the z-axis by adding the z-axis component of the rigid-body motion sensor 120 to the z-axis component of the diffraction-pressure-gradient sensor:

$$a_z = a_z - a_{bz} + a_{bmz} = \frac{+p_4 + p_8 - p_2 - p_6}{4\rho d} + a_{bmz}$$

The sensor response to the z-axis component of the acoustic-wave particle acceleration is exact to the extent that $a_{bmz}=a_{bz}$; i.e., the relative accuracy of the diffraction-pressure-gradient sensor and the rigid-body motion sensor 120. The relative accuracy of the diffraction-pressure-gradient sensor and the rigid-body motion sensor is ±0.1% or better in the preferred embodiment.

The response of the z-axis diffraction-pressure-gradient sensor to flow noise is attenuated by the configuration of FIG. 1 to the same extent as with the y-axis diffraction-pressure-gradient sensor.

The four components of a fluid-borne acoustic wave—the pressure p and the three orthogonal particle motion components $a_x$, $a_y$, and $a_z$—are sensed accurately, and the sensor is unresponsive to the motion of the rigid-body sensor mount and substantially unresponsive to the pseudo-pressure turbulent flow of the acoustic medium past the sensor.

Figure 13:
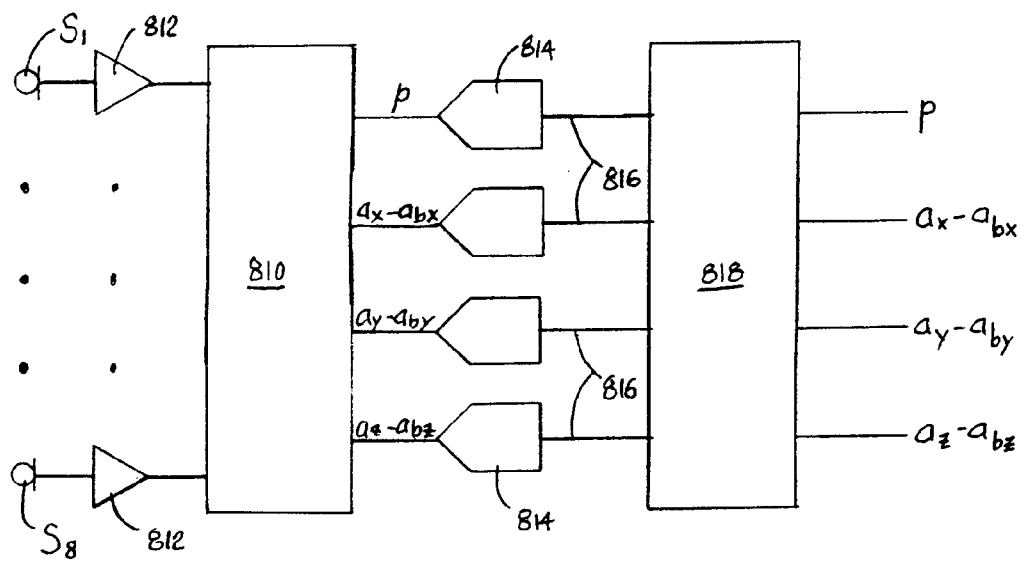
FIG. 13 is a block diagram of another version of a data-acquisition and signal-processing system for the pressure sensors in the multi-component sensor of FIG. 1 using fewer analog-to-digital converters.

Another version of the circuitry composing the data-acquisition channels and digital signal processing is shown in FIG. 13 using only four A-D converters, instead of the eight used in FIG. 12. Each of the pressure sensors S1-S8 is connected to an analog signal processor (ASP) 810 through a preamplifier 812. The ASP performs some of the signal-combining functions of the DSP 806 of FIG. 12 to reduce the number of A-D converters required. For example, the ASP 810 uses analog circuitry to form output signals p, $(a_x-a_{bx})$, $(a_y-a_{by})$, and $(a_z-a_{bz})$. Those four analog output signals are digitized in four A-D converters 814, and those digitized output signals 816 are applied to a DSP 818, which may perform the other functions performed by the DSP 806 of FIG. 12, such as performing cross-correlations to dynamically maintain the frequency-response matching and combining the pressure-gradient signals with the rigid-body motion signals. The DSP may be local to each pressure-gradient sensor or remotely located. Thus, the ASP system of FIG. 13 requires fewer A-D converters than pressure sensors. Frequency-response magnitude and phase matching may be set and maintained by the ASP and the DSP. Furthermore, computations of other equations subsequently described in connection with the sensors may be performed by the ASP or the DSP.

The minimum number of pressure sensors needed to sense the four components of a fluid-borne acoustic wave is four. In a second configuration referring to FIG. 1, only four pressure sensors $S_1$, $S_3$, $S_6$, and $S_8$ are used. The compound pressure-sensor response to acoustic-wave pressure is then given by $$p = \frac{p_1 + p_3 + p_6 + p_8}{4}$$

To obtain the x-axis component of the acoustic-wave particle acceleration, the x-axis component of rigid-body motion sensor 120 is added to the x-axis component of the pressure-gradient sensor:

$$a_x = a_x - a_{bx} + a_{bmx} = \frac{+p_1 + p_3 - p_6 - p_8}{2\rho l} + a_{bmx}$$

To obtain the y-axis component of the acoustic-wave particle acceleration, the y-axis component of rigid-body motion sensor 120 is added to the y-axis component of the pressure-gradient sensor:

$$a_y = a_y - a_{by} + a_{bmy} = \frac{+p_3 - p_1}{2\rho d} + a_{bmy}$$

To obtain the z-axis component of the acoustic-wave particle acceleration, the z-axis component of rigid-body motion sensor 120 is added to the z-axis component of the pressure-gradient sensor:

$$a_z = a_z - a_{bz} + a_{bmz} = \frac{+p_8 - p_6}{2\rho d} + a_{bmz}$$

There is about 3 dB less attenuation of flow noise on each of the four sensed components of the acoustic wave with this minimal number of sensors relative to the eight-sensor configuration of FIG. 1. This is so because there are half the number of elements in the compound p and $a_x$ sensors and because there is half the element length L in the compound $a_y$ and $a_z$ sensors.

In a third configuration referring to FIG. 1, only pressure sensors $S_2$, $S_4$, $S_5$, and $S_7$ are used. The compound pressure-sensor response to acoustic-wave pressure is then given by $$p = \frac{p_2 + p_4 + p_5 + p_7}{4}$$

To obtain the x-axis component of the acoustic-wave particle acceleration, the x-axis component of rigid-body motion sensor 120 is added to the x-axis component of the pressure-gradient sensor:

$$a_x = a_x - a_{bx} + a_{bmx} = \frac{+p_2 + p_4 - p_5 - p_7}{2\rho l} + a_{bmx}$$

To obtain the y-axis component of the acoustic-wave particle acceleration, the y-axis component of rigid-body motion sensor 120 is added to the y-axis component of the pressure-gradient sensor:

$$a_y = a_y - a_{by} + a_{bmy} = \frac{+p_7 - p_5}{2\rho d} + a_{bmy}$$

To obtain the z-axis component of the acoustic-wave particle acceleration, the z-axis component of rigid-body motion sensor 120 is added to the z-axis component of the pressure-gradient sensor:

$$a_z = a_z - a_{bz} + a_{bmz} = \frac{+p_4 - p_2}{2\rho d} + a_{bmz}$$

There is about 3 dB less attenuation of flow noise on each of the four sensed components of the acoustic wave with this minimal number of sensors relative to the eight-sensor configuration of FIG. 1. This is so because there are half the number of elements in the compound p and $a_x$ sensors and because there is half the element length L in the compound $a_y$ and $a_z$ sensors.

When the pressure-gradient sensor is mounted as in FIG. 1 in a rigid mounting body 102 around whose circumference acoustic waves diffract, the pressure-gradient sensor operates as a diffraction-pressure-gradient sensor along the y and z axes perpendicular to the in-line, or x, direction. The resulting y and z diffraction-pressure-gradient sensors are more sensitive to particle motion than a pressure-gradient sensor not configured to detect an acoustic wave diffracted around a mounting body. Along the in-line direction, the x-axis, the sensor operates as a pressure-gradient sensor, there being no diffraction of acoustic waves around the rigid mounting body along the x axis. In general, a very long cylinder does not respond to the particle motion of an acoustic wave propagating in the direction of the axis of the cylinder.

Figure 2:
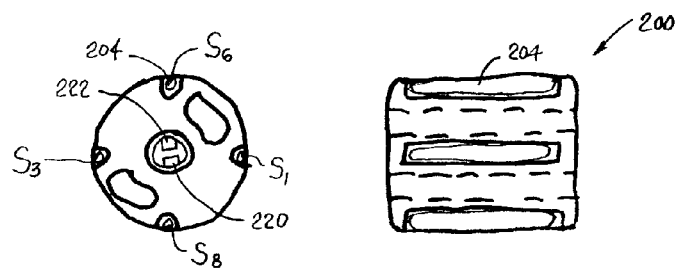
FIG. 2 includes a side view and a cross-section view of another version of a multi-component sensor having four pressure sensors.
Figure 3:
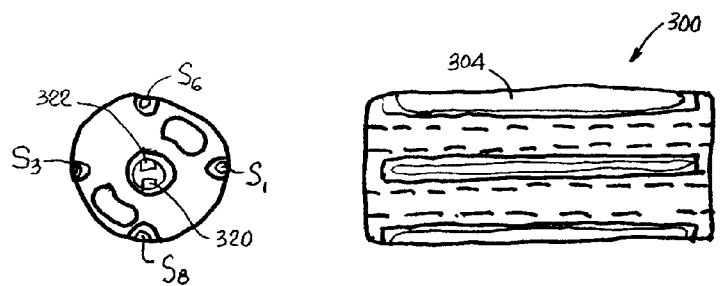
FIG. 3 includes a side view and a cross-section view of yet another version of a multi-component sensor having four longer pressure sensors.
Figure 4:
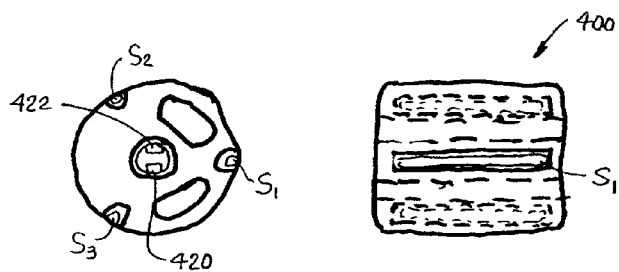
FIG. 4 includes a side view and a cross-section view of yet another version of a multi-component sensor having only three pressure sensors.

There are variations of the sensor that sense fewer than four components of a fluid-borne acoustic wave as illustrated in FIGS. 2-4. Four pressure sensors and two rigid-body motion sensors 220, 320 or 420 may be used to sense three components of the acoustic wave—the pressure and two orthogonal particle-motion components. Alternatively, only three pressure sensors and two rigid-body motion sensors 220, 320 or 420 are the minimum number needed to sense three components of the acoustic wave—the pressure and two orthogonal particle-motion components. Similarly, two pressure sensors and one rigid-body motion sensor 220, 320 or 420 are the minimum number needed to sense two components of the acoustic wave—the pressure and one particle-motion component. The direction of the sensed particle-motion component is referenced to the mounting body. If dynamic rotation of the sensor's mounting body is possible, then the method of using an orientation sensor 222, 322, or 422, as described with respect to the sensor of FIG. 1, is required, and the minimum number of pressure sensors required is three or four. The formulation of the compound pressure sensor p is always the average of the outputs of the individual constituent pressure sensors. The sensor response to flow noise on each sensed component increases as the number or length of the pressure sensors used for each sensed component is reduced.

Conversely, more than eight pressure sensors, such as twelve or sixteen or more, may be used to sense the four components of a fluid-borne acoustic wave to further reduce the sensor response to flow noise below that achievable with the eight-pressure-sensor configuration of FIG. 1.

A three-component sensor may be realized as shown in FIG. 1 by using only the sensors and equations that produce p and any two of $a_x$, $a_y$, and $a_z$. A two-component sensor may be realized as shown in FIG. 1, by using only the sensors and equations that produce p and any one of $a_x$, $a_y$, and $a_z$.

A three-component sensor 200 may be realized as shown in FIG. 2, where sensors $S_1$, $S_3$, $S_6$, and $S_8$ produce pressure responses $p_1$, $p_3$, $p_6$, and $p_8$ respectively, and the equations for p, $a_y$, and $a_z$ apply. An example of a water acoustic sensor having a configuration as shown in FIG. 2 has a sensor length L of 50 mm and a diameter d of 50 mm; the separation $l_c$ of pressure sensors 90° apart on the circumference is 39.3 mm.

There is about 3 dB less attenuation of flow noise on each of the three sensed components of the acoustic wave with the sensor of FIG. 2 relative to the eight-sensor configuration of FIG. 1. This is so because there are half the number of elements in the compound p sensor, and because there is half the element length L in the $a_y$ and $a_z$ sensors. A two-component sensor may be realized as shown in FIG. 2 by using only the sensors and equations that produce p and any one of $a_y$ and $a_z$.

A three-component sensor 300 may be realized as shown in FIG. 3, where longer pressure sensors $S_1$, $S_3$, $S_6$, and $S_8$ produce pressure responses $p_1$, $p_3$, $p_6$, and $p_8$ respectively, and the equations for p, $a_y$, and $a_z$ apply. An example of a water acoustic sensor having a configuration as shown in FIG. 3 has a sensor length L of 100 mm and a diameter d of 50 mm; the separation $l_c$ of pressure sensors 90° apart on the circumference is 39.3 mm. There is about the same attenuation of flow noise on each of the three sensed components of the acoustic wave with the sensor of FIG. 3 relative to the eight-sensor configuration of FIG. 1. This is so because the element length L is double even though there are half the number of elements in the compound p sensor and because the element length L in the $a_y$ and $a_z$ sensors is the same as the aggregate length of longitudinally aligned sensors of FIG. 1. A two-component sensor may be realized as shown in FIG. 3 by using only the sensors and equations that produce p and any one of $a_y$ and $a_z$.

A three-component sensor 400 may also be realized as shown in FIG. 4, where pressure sensors $S_1$, $S_2$, and $S_3$ spaced circumferentially at regular 120° intervals produce pressure responses $p_1$, $p_2$, and $p_3$ respectively. The compound sensor response to acoustic wave pressure is then given by $$p = \frac{p_1 + p_2 + p_3}{3}$$

As shown by Morse, an acoustic wave diffracting around a rigid cylinder produces a pressure on the surface of the cylinder that varies from a maximum on the near side to a minimum on the far side resulting in the following diffraction-pressure-gradient equations.

To obtain the y-axis component of the acoustic-wave particle acceleration, the y-axis component of rigid-body motion sensor 420 is added to the y-axis component of the diffraction-pressure-gradient sensor:

$$a_y = a_y - a_{by} + a_{bmy} = \frac{+p_2 + p_3 - p_1}{2\rho d} + a_{bmy}$$

To obtain the z-axis component of the acoustic-wave particle acceleration, the z-axis component of rigid-body motion sensor 420 is added to the z-axis component of the diffraction-pressure-gradient sensor:

$$a_z = a_z - a_{bz} + a_{bmz} = \frac{+p_2 - p_3}{\sqrt{3}\,\rho d} + a_{bmz}$$

An example of a water acoustic sensor having a configuration as shown in FIG. 4 has a sensor length L of 50 mm and a diameter d of 50 mm; the separation $l_c$ of pressure sensors 120° apart on the circumference is 53.4 mm. There is about 4.3 dB less attenuation of flow noise on each of the three sensed components of the acoustic wave with the sensor of FIG. 4 relative to the eight-sensor configuration of FIG. 1. This is so because there are three-eighths the number of elements in the compound p sensor and because there is half the element length L and the circumferential spacing is decreased in the $a_y$ and $a_z$ sensors.

The pressure-gradient sensor and the rigid-body motion sensors that compose the particle-motion sensor may be three-axis sensors that respond to motion along three orthogonal axes, two-axis sensors that respond to motion along two orthogonal axes, or single-axis sensors that respond to motion along a single axis, depending on the requirements of the application.

Figure 5:
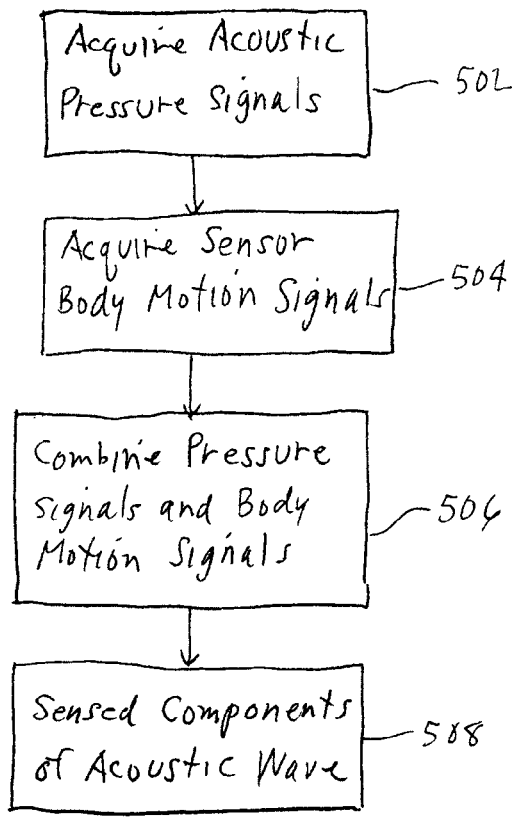
FIG. 5 is a flowchart illustrating a method, usable in the sensors of FIGS. 1-4, for sensing multiple components of a fluid-borne acoustic wave.

FIG. 5 is a flowchart illustrating a sensing method 500. The sensing method 500 includes acquiring acoustic-pressure signals at 502, acquiring sensor body-motion signals at 504, combining pressure signals and body-motion signals at 506, and producing sensed components of the acoustic wave at 508.

To carry out the sensing method 500, as few as two to as many as eight or more acoustic pressure signals $p_1$-$p_8$ are acquired at 502 from pressure sensors $S_1$-$S_8$. The pressure-signal acquisition at 502 may be realized by data-acquisition channels, each channel consisting of a pressure sensor, its conditioning amplifier, and its corresponding data-acquisition device, producing one of the outputs $p_1$-$p_8$, such as in the circuitry of FIG. 12 or 13. At 504, as few as one to as many as three sensor mounting-body-motion signals $a_{bmx}$, $a_{bmy}$, and $a_{bmz}$ are acquired from a motion sensor corresponding to 120 or 220 or 320 or 420. The motion-signal acquisition at 504 may be realized by data-acquisition channels, each channel consisting of a motion sensor, its conditioning amplifier, and its corresponding data-acquisition device, producing one of the outputs $a_{bmx}$, $a_{bmy}$, and $a_{bmz}$. At 506, the optional step of measuring the matching of the frequency-response amplitude and phase among the data acquisition channels may be carried out. Optionally applying the respective amplitude and phase correction to each acoustic-pressure data-acquisition channel matches the channels $p_1$-$p_8$ to better than ±0.1% among each other and to the compound pressure response p. Combining body-motion signals and pressure signals at 506 is realized by performing the mathematical operations described by the equations previously given. At 508, up to four components of a fluid-borne acoustic wave, the pressure p and one to three of the orthogonal particle motion components $a_x$, $a_y$, and $a_z$, are produced. The result at 508 is unresponsive to the motion of the rigid-body sensor mount and substantially unresponsive to the pseudo-pressure turbulent flow of the acoustic medium past the sensor.

Although described with reference to the sensor 100, 200, 300 or 400, the method 500 may be performed using equivalent hardware known in the art to that described. Furthermore, the method 500 may be performed using hardware, software, or combinations of hardware and software. For example, the sensing method 500 may be carried out, in whole or in part, by a processor of a data-processing apparatus processing in accordance with a set of computer-readable instructions, as described in additional detail with reference to FIG. 6.

In embodiments implemented using a data-processing apparatus executing computer-readable instructions, the computer readable instructions are stored on a computer-readable storage medium, that, when executed by a processor, configure and direct the processor or the processing apparatus to perform features of the sensor 100, 200, 300 or 400, and the method 500. Non-limiting examples of the computer-readable storage medium include random-access memories (RAMs), read-only memories (ROMs), optical discs (CDs or DVDs), and magnetic-storage media.

Figure 6:
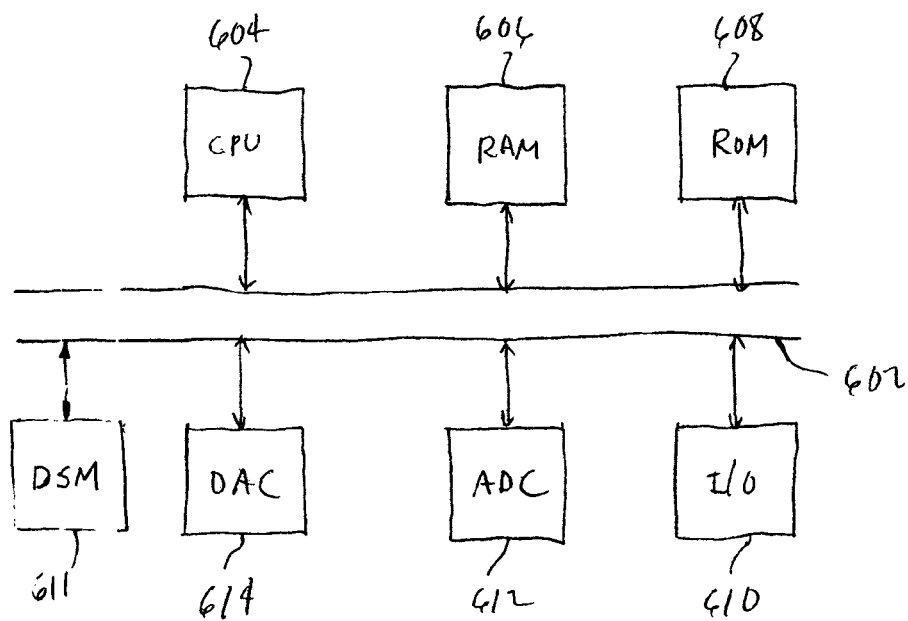
FIG. 6 is a block diagram illustrating a data-processing apparatus usable in the sensors of FIGS. 1-4.

FIG. 6 illustrates a data-processing apparatus embodiment 600. The data-processing apparatus 600 includes a system bus 602, a processor 604, a RAM 606, a ROM 608, and a data input/output interface 610, and a computer-readable data-storage medium device (DSM) 611. In some embodiments, the data-processing apparatus includes an analog-to-digital converter (ADC) 612 and a digital-to-analog converter (DAC) 614.

In operation, computer-readable program instructions are loaded from at least one of the RAM 606, the ROM 608, and other storage media (not illustrated) into the processor 604 for execution. When executed by the processor 604, the computer-readable program instructions configure and direct the processor 604 to perform features of the sensor 100, 200, 300 or 400 and the sensing method 500. This constitutes one means for combining the first sensor output signal and the second sensor output signal, one means for matching the magnitude and phase of the frequency response of the acoustic-wave pressure sensors, one means for computing cross-correlations among the frequency responses of each of the acoustic-wave pressure sensors, and one means for subtracting the matched frequency responses of the pressure sensors. Additionally, to facilitate the implementation of the sensing method 500 by the data-processing apparatus, sensed signals may be converted using the ADC 612, so that the processor 604 is able to operate upon a digital copy of the sensed signals. The digital copies of the acoustic-pressure signals, the pressure-gradient signals, the rigid-body motion signals, the motion sensor signals, and the computed components of the acoustic wave, for example, may be stored as sensor data on a computer-readable data-storage medium by a data-storage device 611 for off-line or remote processing by another processor. Further, along with processing of the sensing method 500 by the data-processing apparatus, sensed signals may be converted by the DAC 614 to analog sensed signals for further use.

The processor 604 may include a general purpose Central Processing Unit (CPU), a Digital Signal Processor (DSP), a Field Programmable Gate Array (FPGA), or an Application Specific Integrated Circuit (ASIC).

Figure 7:
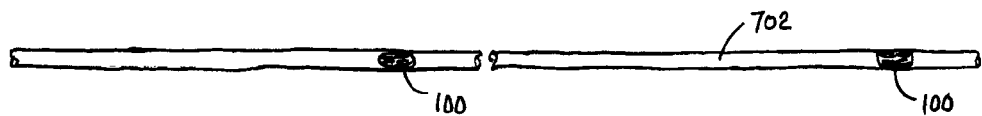
FIG. 7 is a side view of a portion of an underwater cable housing sensors as in FIGS. 1-4 at discrete positions along its length.
Figure 8:
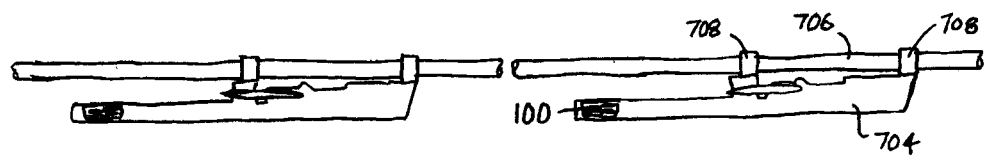
FIG. 8 is a side elevation view of a portion of a towed streamer having positioning-control devices rotatably attached at discrete positions along the length of the streamer and housing sensors as in FIGS. 1-4.
Figure 9:
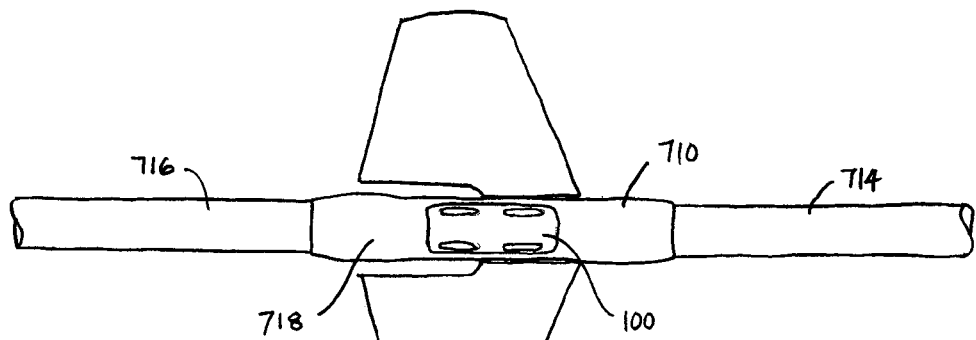
FIG. 9 is a side or plan view of a cable-positioning device mounted in-line between streamer sections and housing a sensor as in FIGS. 1-4 in its central body.
Figure 10:
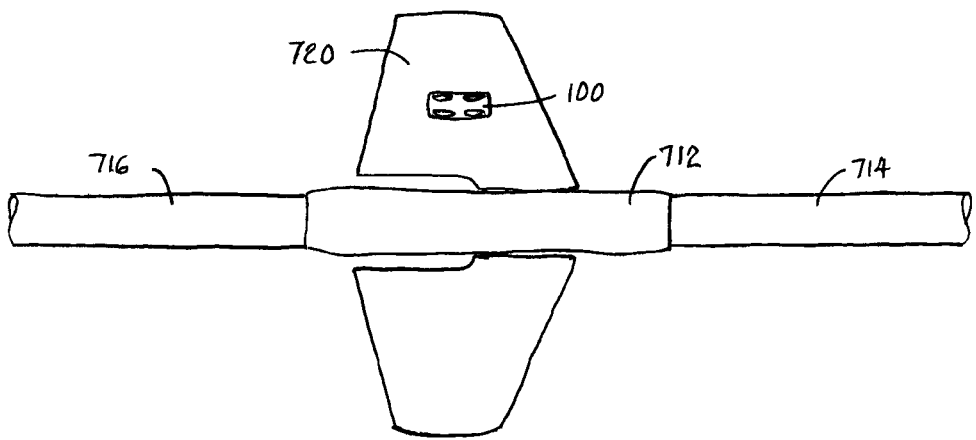
FIG. 10 is a side or plan view of a cable-positioning device mounted in-line between streamer sections and housing a sensor as in FIGS. 1-4 in one of its control vanes.
Figure 11:
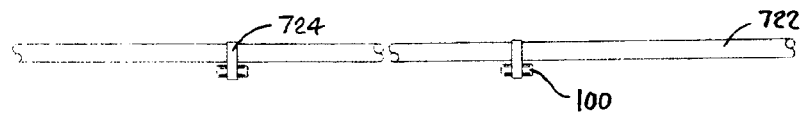
FIG. 11 is a side view of sensors as in FIGS. 1-4 attached at spaced apart positions along a tow rope or cable.
Figure 14:
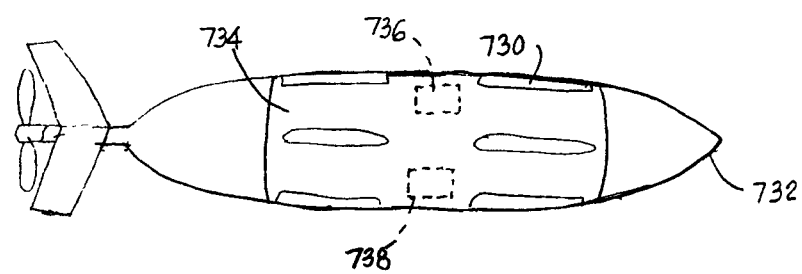
FIG. 14 is a side view of an autonomous underwater recording device housing sensors as in FIGS. 1-4.

The particle-motion sensor 100 is shown deployed in various ways in FIGS. 7-11 and 14. In FIG. 7, the sensor 100 and its rigid mounting body is shown housed in an underwater cable 702, such as an ocean-bottom cable or a towed streamer. In FIG. 8, the sensor 100 is shown housed in the body of a cable-positioning device such as a cable-leveling or -steering bird 704 that is rotatably attached to a towed streamer 706 by collars 708. FIGS. 9 and 10 also show the sensor housed in cable-steering devices 710, 712. Both these devices are inline devices connected between streamer sections 714, 716 fore and aft. In FIG. 9, the sensor 100 is housed in the bird's main body 718. In FIG. 10, the sensor is housed in one of the bird's control vanes, or wings 720. The sensor's rigid mounting body may form part of the bird's structure or be a separately formed piece that is received in a cavity in the bird. In FIG. 11, sensors 100 are shown attached to a tow rope 722 or cable by attachments, such as straps 724 or collars, at spaced apart positions along the rope's length. This version replaces a fully instrumented streamer with a much less expensive tow rope, such as a 3.5-in diameter rope. In all these versions, the sensor and its rigid mounting body are mechanically coupled directly or indirectly to the underwater cable. In FIG. 14, the sensor 730 is shown deployed in an autonomous recording device, shown in an underwater vehicle (UAV) 732 in this example. The sensor measures the pressure and particle-motion response of an acoustic plane wave and separates it from the dynamic motion of the autonomous recording device. The autonomous recorder could have autonomous recording features such as batteries, a stable clock, and memory as offered in the Fairfield Z700 node manufactured by Fairfield Nodal of Houston, Tex., U.S.A. The UAV could be, for example, the Hugin 1000 Manufactured by Kongsberg Maritime of Kongsberg, Norway, or the APEX Autonomous Underwater Glider manufactured by Teledyne Webb Research of East Falmouth, Mass., U.S.A. The system provides autonomous measurement of the pressure wave with ghost-notch and device-motion rejection while floating freely in water. The sensor's rigid body 734 can form part of the UAV's fuselage or be a separate body mounted in a cavity in the UAV. The UAV, as well as the birds of FIGS. 7-10 and the sensors of FIG. 11, could also include a data-processing system 736 and a computer-readable data-storage medium 738 for recording measured and computed sensor signals.

Although the invention has been described in detail with reference to a single version with variations, other versions are possible. For example, the conditioning and scaling of individual acoustic-pressure and motion measurements and all the other computations described may be performed in real time or off-line in post-processing. This may include scaling of the acoustic particle-motion measurement by the acoustic impedance. It may also include differentiation or integration of signals so that they are spectrally matched. Furthermore, the method of combining hydrophone and particle-motion sensors can be done by pz-summation, as described, or by any of the other means being used or studied to reduce the effects of multiples or the ghost notch. So, as these few examples suggest, the versions described in detail are meant to help exemplify and not limit the invention.

What is claimed is:

1. An underwater acoustic-wave particle-motion sensor comprising:
    a rigid body having a periphery around which an underwater acoustic wave diffracts;
    a pressure-gradient sensor having a plurality of pressure sensors mounted in the rigid body at the periphery to sense the diffracted acoustic wave and further producing a first sensor output signal that responds to acoustic-wave particle motion and to rigid-body motion; and
    a rigid-body motion sensor disposed in the rigid body and producing a second sensor output signal that corresponds almost entirely to rigid-body motion.

2. The underwater acoustic-wave particle-motion sensor of claim 1 further comprising means for combining the first and second sensor output signals to produce a response to acoustic-wave particle motion with rigid-body motion excluded.

3. The underwater acoustic-wave particle-motion sensor of claim 2 wherein the means for combining is remote from the rigid body.

4. The underwater acoustic-wave particle-motion sensor of claim 1 wherein the pressure sensors have a length longer than a characteristic length of turbulent-flow eddies formed by turbulent flow so as to be unresponsive to the pseudo-pressure of the turbulent flow past the underwater acoustic-wave particle-motion sensor.

5. The underwater acoustic-wave particle-motion sensor of claim 1 wherein the pressure sensors have individual frequency responses; and
    wherein the pressure-gradient sensor further comprises means for combining the individual frequency responses to produce the first sensor output signal;
    wherein the individual frequency responses of the pressure sensors are matched over an operating-frequency range to attenuate the response in the first sensor output signal to acoustic-wave pressure below the response to acoustic-wave particle motion.

6. The underwater acoustic-wave particle-motion sensor of claim 5 wherein the individual frequency responses of the pressure sensors are matched over the operating-frequency range to within ±0.1% in magnitude and phase.

7. The underwater acoustic-wave particle-motion sensor of claim 5 wherein the means for combining the individual frequency responses subtracts the frequency responses of pairs of the pressure sensors to produce a differential frequency response for each of the pairs to produce the first sensor output signal.

8. The underwater acoustic-wave particle-motion sensor of claim 1 wherein the pressure sensors each produce an individual pressure-sensor signal; and
wherein the pressure-gradient sensor comprises means for computing cross-correlations between each of the individual pressure-sensor signals and a compound pressure signal representing the sum of the individual pressure-sensor signals to derive magnitude and phase corrections to be applied to each of the individual pressure-sensor signals.

9. The underwater acoustic-wave particle-motion sensor of claim 1 wherein the rigid body has a central longitudinal axis and acoustic waves diffract around the periphery and wherein the pressure-gradient sensor operates as a single-axis pressure-gradient sensor along the central longitudinal axis and as a two-axis pressure-gradient sensor along two orthogonal axes orthogonal to the central longitudinal axis.

10. The underwater acoustic-wave particle-motion sensor of claim 1 wherein the pressure sensors are arranged in pairs of longitudinally aligned pressure sensors circumferentially spaced around the periphery of the rigid body.

11. The underwater acoustic-wave particle-motion sensor of claim 1 wherein the pressure-gradient sensor and the rigid-body motion sensor are three-axis sensors responsive to motion along one or more orthogonal axes.

12. The underwater acoustic-wave particle-motion sensor of claim 1 wherein the pressure sensors are disposed at regularly spaced locations around the periphery of the rigid body.

13. The underwater acoustic-wave particle-motion sensor of claim 1 wherein the rigid body includes a cavity for receiving the rigid-body motion sensor isolated from the diffracted acoustic wave.

14. The underwater acoustic-wave particle-motion sensor of claim 1 wherein the rigid-body motion sensor has a frequency response that includes dc for sensing gravity.

15. The underwater acoustic-wave particle-motion sensor of claim 1 further comprising an orientation sensor co-located with the rigid-body motion sensor.

16. The underwater acoustic-wave particle-motion sensor of claim 1 wherein the rigid body is coupled to an underwater cable.

17. The underwater acoustic-wave particle-motion sensor of claim 1 wherein the rigid body is disposed in a cable-positioning device coupled to an underwater cable.

18. The underwater acoustic-wave particle-motion sensor of claim 1 wherein the rigid body is disposed in an autonomous underwater recording device.

19. The underwater acoustic-wave particle-motion sensor of claim 1 wherein the rigid body is disposed in an autonomous underwater vehicle moving through water.

20. The underwater acoustic-wave particle-motion sensor of claim 1 wherein the pressure sensors are fabricated from the same batch of piezoelectric material.

21. The underwater acoustic-wave particle-motion sensor of claim 1 further comprising circuitry to condition output signals of the pressure sensors to within ±0.1% of each other in magnitude and phase.

22. The underwater acoustic-wave particle-motion sensor of claim 1 further comprising a plurality of data-acquisition channels, each data acquisition channel being associated with one of the pressure sensors, wherein each data-acquisition channel includes an analog-to-digital converter providing a digitized pressure signal.

23. The underwater acoustic-wave particle-motion sensor of claim 22 further comprising a digital signal processor receiving the digitized pressure signals from the analog-to-digital converters.

24. An underwater sensor system comprising:
an underwater cable;
a rigid body coupled to the underwater cable and having a periphery around which an underwater acoustic wave diffracts;
a pressure-gradient sensor including a plurality of pressure sensors mounted in the rigid body at the periphery and producing a first sensor output signal that responds to acoustic-wave particle motion and to rigid-body motion;
a rigid-body motion sensor disposed in the rigid body and producing a second sensor output signal that corresponds almost entirely to rigid-body motion.

25. The underwater sensor system of claim 24 further comprising means for combining the first sensor output signal and the second sensor output signal to produce a response to acoustic-wave particle motion with rigid-body motion substantially excluded.

26. The underwater sensor system of claim 25 wherein the means for combining is remote from the rigid body.

27. The underwater sensor system of claim 24 further comprising circuitry capable of producing from the first and second sensor output signals a signal that is substantially free of rigid-body motion.

28. The underwater sensor system of claim 24 wherein the rigid body is generally cylindrical with an outer periphery and a central longitudinal axis and recesses opening onto the outer periphery at circumferentially spaced locations, the plurality of pressure sensors each residing in one of the recesses.

29. The underwater sensor system of claim 28 wherein the recesses are equally spaced around the periphery.

30. The underwater sensor system of claim 28 wherein the recesses are arranged in longitudinally spaced pairs.

31. The underwater sensor system of claim 24 wherein the rigid body includes a cavity receiving the rigid-body motion sensor and isolates the rigid-body motion sensor from the underwater acoustic wave.

32. The underwater sensor system of claim 24 wherein the rigid body is housed in the underwater cable.

33. The underwater sensor system of claim 24 further comprising an external device attached to the underwater cable and wherein the rigid body is disposed in the external device.

34. The underwater sensor system of claim 33 wherein the underwater cable is a towed streamer and the external device is a cable-positioning device.

35. The underwater sensor system of claim 24 wherein the underwater cable is a towed streamer and further comprising a cable-positioning device attached to the towed streamer and having a control vane, wherein the rigid body is disposed in the control vane.

36. The underwater sensor system of claim 24 wherein the underwater cable is a tow rope or cable and further comprising attachments attaching the rigid body to the tow rope or cable at spaced apart positions along the length of the tow rope or cable.

37. The underwater sensor system of claim 24 wherein the pressure sensors are fabricated from the same batch of piezoelectric material.

38. The underwater sensor system of claim 24 further comprising circuitry to condition output signals of the pressure sensors to within ±0.1% of each other in magnitude and phase.

39. The underwater sensor system of claim 24 further comprising a plurality of data-acquisition channels, each data acquisition channel being associated with one of the pressure sensors, wherein each data-acquisition channel includes an analog-to-digital converter providing a digitized pressure signal.

40. The underwater sensor system of claim 39 further comprising a digital signal processor receiving the digitized pressure signals from the analog-to-digital converters.

* * * * *